(12) United States Patent
Armangau et al.

(10) Patent No.: US 10,365,828 B1
(45) Date of Patent: Jul. 30, 2019

(54) TECHNIQUES FOR EFFICIENTLY ORGANIZING STORAGE OF COMPRESSED EXTENTS

(71) Applicant: EMC IP Holding Company LLC, Hopkinton, MA (US)

(72) Inventors: Philippe Armangau, Acton, MA (US); Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/966,878

(22) Filed: Apr. 30, 2018

(51) Int. Cl.
*G06F 3/06* (2006.01)
*G06F 12/0875* (2016.01)

(52) U.S. Cl.
CPC .......... *G06F 3/0608* (2013.01); *G06F 3/0656* (2013.01); *G06F 3/0673* (2013.01); *G06F 12/0875* (2013.01); *G06F 2212/1044* (2013.01); *G06F 2212/401* (2013.01)

(58) Field of Classification Search
CPC .... G06F 3/0608; G06F 3/0656; G06F 3/0673; G06F 2212/1044; G06F 2212/401
See application file for complete search history.

(56) References Cited

U.S. PATENT DOCUMENTS

| 9,779,023 | B1 | 10/2017 | Armangau et al. |
| 9,985,649 | B1 | 5/2018 | Bassov et al. |
| 2003/0079081 | A1* | 4/2003 | Okada ................ G06F 3/0601 711/113 |
| 2003/0084238 | A1* | 5/2003 | Okada ................ G06F 3/0601 711/113 |
| 2006/0212672 | A1* | 9/2006 | Chandrasekaran ... G06F 3/0608 711/171 |

(Continued)

FOREIGN PATENT DOCUMENTS

WO   20150199574   12/2015

OTHER PUBLICATIONS

King, J.; "The Bin Packing Problem," Ardrey Kell High School Website, Sep. 19, 2012, 5 pages, retrieved from http://mrking.cmswiki.wikispaces.net/file/detail/BinPacking.docx on Apr. 26, 2018.

(Continued)

*Primary Examiner* — Than Nguyen
(74) *Attorney, Agent, or Firm* — BainwoodHuang

(57) ABSTRACT

A technique for efficiently storing compressed data of a storage object in a data storage includes (a) receiving, in a cache buffer, a number, U, of uncompressed blocks of a uniform size, the uncompressed data blocks received in write requests directed to the storage object; (b) compressing the uncompressed blocks of the cache buffer into respective compressed extents; (c) performing an optimization operation including generating a set of distributions of compressed extents among a plurality of containers and searching the set for a distribution having a minimal total amount of storage taken up by its respective plurality of containers, each container having a respective size equal to a respective integer multiple of the uniform size of the uncompressed data blocks; and (d) storing the compressed extents within a plurality of containers in persistent storage in accordance with the distribution having the minimal total amount of storage taken up by its respective plurality of containers.

14 Claims, 3 Drawing Sheets

(56) References Cited

U.S. PATENT DOCUMENTS

2010/0017578 A1* 1/2010 Mansson ............... G06F 12/023
 711/171
2017/0212690 A1* 7/2017 Babu ..................... G06F 3/0608

OTHER PUBLICATIONS

Ivan Bassov; "Tool for Selectively Deploying Inline Compression," U.S. Appl. No. 15/966,584, filed Apr. 30, 2018.
Philippe Armangau, et al.; "Compression of Host I/O Data in a Storage Processor of a Data Storage System With Selection of Data Compression Components Based on a Current Fullness Level of a Persistent Cache," U.S. Appl. No. 15/957,065, filed Apr. 19, 2018.
Yining Si, et al.; "Inline Compression With Small-Write Compression Avoidance," U.S. Appl. No. 15/662,676, filed Jul. 28, 2017.
Philippe Armangau, et al.; "Overwriting Compressed Data Extents," U.S. Appl. No. 15/499,206, filed Apr. 27, 2017.
Ivan Bassov, et al.; "Compressing Data in Line Using Weighted Compression Budgets," U.S. Appl. No. 15/392,639, filed Dec. 28, 2016.
Yaming Kuang, et al.; "Recovering Compressed Data to Reduce Data Loss," U.S. Appl. No. 15/395,968, filed Dec. 30, 2016.
Yining Si, et al.; "Write Tagging for Selective Avoidance of Inline Compression," U.S. Appl. No. 15/499,467, filed Apr. 27, 2017.
Soumyadeep Sen, et al.; "Unaligned IO Cache for Inline Compression Optimization," U.S. Appl. No. 15/884,739, filed Jan. 31, 2018.
Ilya Usvyatsky, et al.; "Techniques for De-Duplicating Data Storage Systems Using a Segmented Index," U.S. Appl. No. 15/394,376, filed Dec. 29, 2016.
Philippe Armangau, et al.; "Managing Inline Data Compression in Storage Systems," U.S. Appl. No. 15/393,443, filed Dec. 29, 2016.
"Framework for Inline Compression Performance Assessment," U.S. Appl. No. 15/281,252, filed Sep. 30, 2016.

* cited by examiner

TECHNIQUES FOR EFFICIENTLY ORGANIZING STORAGE OF COMPRESSED EXTENTS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Data storage systems commonly arrange data in structures known as filesystems. Such file systems include both data and metadata. The metadata organizes the file data on disk, such that each file's data can be located, placed in proper sequence, and kept separate from other files' data.

Some filesystems employ compression. Compression allows the data within the filesystem to be stored in a reduced amount of space. Compression may be performed "inline" in certain filesystems, allowing data to be stored in compressed form "on-the-fly" as it is received.

SUMMARY

In some data storage systems, as data is ingested it is compressed into compressed extents which are then combined into segments, which are containers for compressed extents, each segment made up of several data blocks. However, this arrangement often results in a significant amount of wasted space at the end of each segment, as the leftover space is not large enough to fit another compressed extent. This results in the effective compression ratio being less than optimal.

Thus, it would be desirable to operate an inline compression system to efficiently pack compressed extents together into segments while reducing or minimizing wasted space. This may be done by buffering a stream of block writes in a cache until a certain number have been received and then applying techniques to pack them in compressed form into a more optimal number of segments. In some embodiments, the size of each segment is a variable number of blocks, allowing even more flexibility.

In one embodiment, a method of efficiently storing compressed data of a storage object in a data storage system is performed. The method includes (a) receiving, in a cache buffer, a number, U, of uncompressed data blocks of a uniform size, the uncompressed data blocks received in write requests directed to the storage object; (b) compressing the U uncompressed data blocks of the cache buffer into respective compressed extents; (c) performing an optimization operation including generating a set of distributions of compressed extents among a plurality of containers and searching the set for a distribution having a minimal total amount of storage taken up by its respective plurality of containers, each container having a respective size equal to a respective integer multiple of the uniform size of the uncompressed data blocks; and (d) storing the compressed extents within a plurality of containers in persistent storage in accordance with the distribution having the minimal total amount of storage taken up by its respective plurality of containers. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for operating an inline compression system to efficiently pack compressed extents together into segments while reducing or minimizing wasted space. This may be done by buffering a stream of block writes in a cache until a certain number have been received and then applying techniques to pack them in compressed form into a more optimal number of segments. In some embodiments, the size of each segment is a variable number of blocks, allowing even more flexibility.

Figure 1:
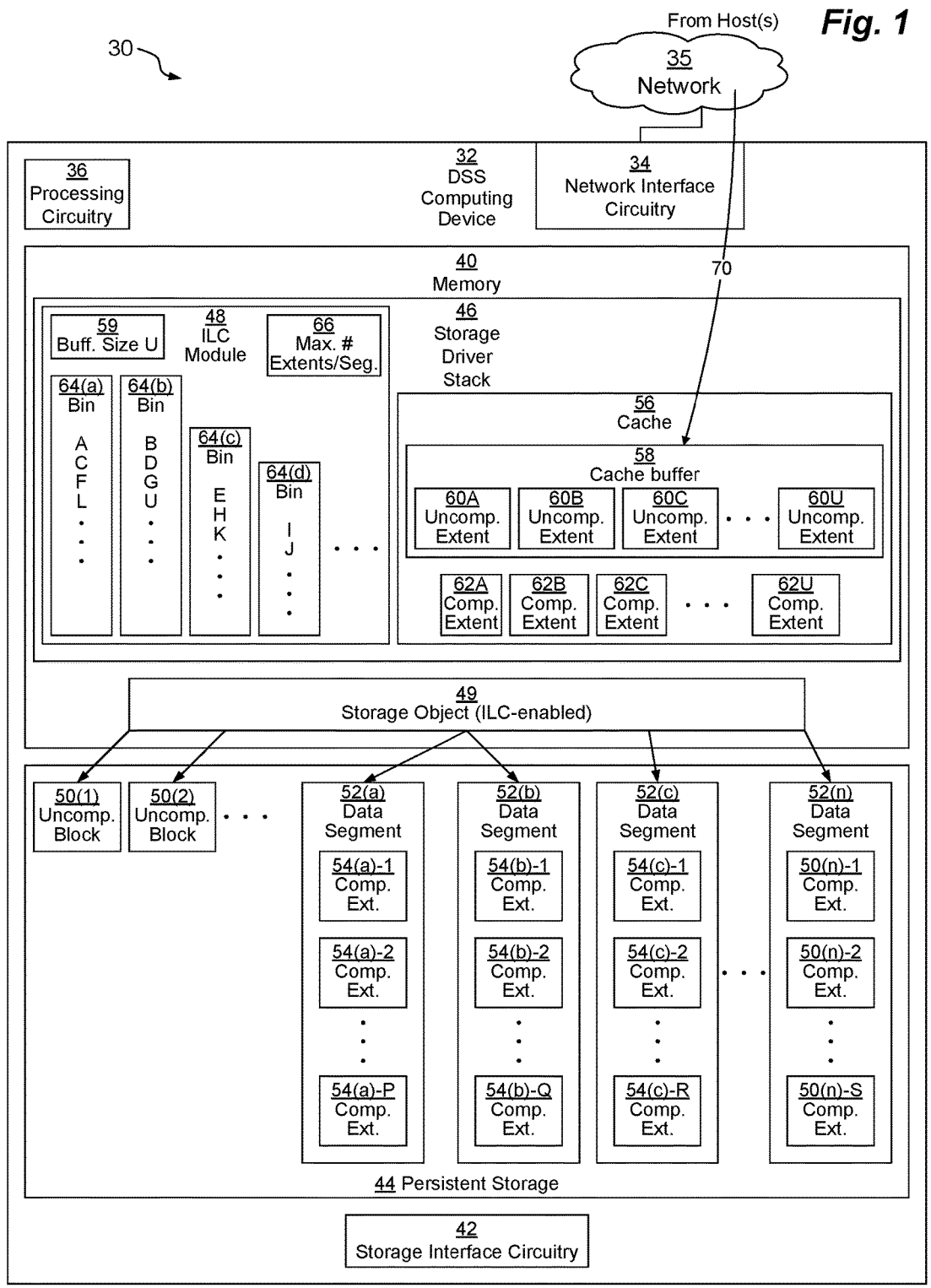
FIG. 1 is a block diagram depicting an example system and apparatus for use in connection with various embodiments.

FIG. 1 depicts an example environment 30 including a computing device 32 serving as a data storage system (DSS). DSS computing device 32 may be any kind of computing device, such as, for example, a personal computer, workstation, server computer, enterprise server, DSS rack server, laptop computer, tablet computes, smart phone, mobile computer, etc. In an example, computing device 32 is a DSS rack server, such as a VNX or VMAX data storage array produced by Dell/EMC of Hopkinton, Mass.

DSS computing device 32 includes network interface circuitry 34, processing circuitry 36, memory 40, storage interface circuitry 42, and persistent data storage 44. DSS computing device 32 may also include other components as are well-known in the art, including interconnection circuitry.

Network interface circuitry 34 may include one or more Ethernet cards, cellular modems, Fibre Channel (FC) adapters, Wireless Fidelity (Wi-Fi) wireless networking adapters, and/or other devices for connecting to a network 35. Network interface circuitry 34 allows the DSS computing device 32 to communicate with one or more host devices (not depicted) capable of sending data storage commands to the DSS computing device 32 over the network 35 for fulfillment.

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

In some embodiments, DSS computing device 32 may be built as a set of two or more storage processors (SPs, not depicted) each mounted on a separate board, each SP having its own network interface circuitry 34, processing circuitry 36, memory 40, and storage interface circuitry 42, but sharing the storage 44 between them. In such embodiments, a high-speed inter-SP bus may connect the SPs. There may be more than one SP installed in DSS computing device 32 for redundancy and performance reasons. In these embodiments, each SP may be considered independently for purposes of this disclosure.

Persistent storage 44 may include any kind of persistent storage devices, such as, for example, hard disk drives, solid-state storage devices (SSDs), flash drives, etc. Storage interface circuitry 42 controls and provides access to persistent storage 44. Storage interface circuitry 42 may include, for example, SCSI, SAS, ATA, SATA, FC, M.2, and/or other similar controllers and ports.

In some embodiments, persistent storage 44 may be arranged as a set of storage devices in a RAID configuration. Persistent storage 44 may be logically divided into storage blocks, which, in some embodiments, are 8-kilobyte (KB) extents of data that are individually-addressable (although the size may vary from system to system and even within a given system, depending on the configuration as is well-known in the art). Some blocks may store uncompressed blocks 50 of data, while other blocks may combine together to store a data segment 52, which is a container made up of an integer number of blocks that are logically combined into one large extent.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage driver stack 46 (which may include several different storage-related drivers, not depicted, that are arranged in a stack configuration) which executes on processing circuitry 36 to fulfill data storage requests from hosts. Memory 40 also stores one or more representations of a storage object 49 that uses inline compression (ILC). A storage object is any logical grouping of data that may be written to, read from, created, or deleted that is backed by persistent storage 44. For example, the various kinds of storage objects include a logical volume, a filesystem, an iSCSI logical unit of storage, a directory, and a regular file.

Storage stack 46 also includes an ILC module 48 that is configured to implement ILC as well as a cache 56 that is configured to store uncompressed extents 60 (depicted as uncompressed extents 60A, 60B, 60C, . . . , 60U) of data as they are received from a stream 70 of write commands. Cache 56 stores the uncompressed extents 60 in a cache buffer 58 that is configured to store up to U uncompressed extents 60. Each uncompressed extent 60 represents a block of data that could, in principle, be stored as an uncompressed block 50 within persistent storage. However, due to the use of ILC, the uncompressed extents 60 are first compressed into compressed extents 62 (depicted as compressed extents 62A, 62B, 62C, . . . , 62U). ILC module 48 is configured to efficiently pack the U compressed extents 62 into a set of bins 64 (depicted as bins 64(a), 64(b), 64(c), 64(d), . . . ) and to store each bin 64 as a data segment 52 in persistent storage, each compressed extent 62 corresponding to a compressed extent 54 within the data segments 52 in persistent storage 44.

Memory 40 may also store various other data structures used by the OS, storage driver stack 46, ILC module 48, and various other applications (not depicted). This data includes a buffer size 59 (indicative of U) and a maximum number 66 of compressed extents 54 allowed per data segment 52 within persistent storage, both of which are used by ILC module 48, for example. In one embodiment, the maximum number 66 is twelve, while in other embodiments it may be a different number, typically within a range of 8 to 16, inclusive.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS, applications, storage driver stack 46, ILC module 48, representations of storage objects 49, buffer size 59 and maximum number 66 are typically stored in this persistent storage portion of memory 40 or on persistent storage 44 so that they may be loaded into a system portion of memory 40 from this persistent storage portion of memory 40 or persistent storage 44 upon a system restart or as needed. Storage driver stack 46 or ILC module 48, when stored in non-transient form either in the volatile portion of memory 40 or on persistent storage drives 44 or in persistent portion of memory 40, forms a computer program product. The processing circuitry 36 running one or more applications and/or storage driver stack 46 and/or ILC module 48 thus forms a specialized circuit constructed and arranged to carry out the various processes described herein.

In operation, hosts send data storage requests (e.g., read, write, create, or delete requests) directed at a storage object 49 to a storage stack 46, which translates the data storage requests into lower-level instructions to access particular addresses of persistent storage 44. The storage object 49 is configured in a compressed state, so storage requests that are directed at the storage object 49 are fulfilled with respect to compressed extents 54 of persistent storage 44.

The data storage requests received from hosts include a stream 70 of write commands that include uncompressed extents 60 (each one block in size, e.g., 8 KB), which are then buffered in a cache buffer 58 of cache 56. Once the cache buffer 58 becomes filled, ILC module 48 compresses the uncompressed extents 60 into compressed extents 62 and attempts to efficiently pack them into a set of bins 64, each bin 64 having a size that is an integer multiple of the system block size (e.g., 8 KB). ILC module 48 attempts to do this packing in a manner that creates as little wasted space within each bin 64 as possible. In other words, ILC module 48 attempts to minimize the total number of system blocks that are needed to store the set of bins 64.

In some embodiments, double buffering is used so that once the cache buffer 58 is filled, another cache buffer (not depicted) is used to buffer new uncompressed extents 60 received from the stream 70 to avoid delays while the cache buffer 58 is emptied.

Once the ILC module 48 packs the bins 64 efficiently, the storage driver stack 46 writes these bins 64 to persistent storage 44 as data segments 52. Storage driver stack 46 also maintains metadata structures (e.g., inodes, indirect blocks, and intermediate pointer structures such as virtual block maps or VBMs) as part of the various storage objects 49 that allow each storage object to point to particular compressed extents 54 within the data segments 52 as logically-addressable regions of that storage object 49.

Figure 2:
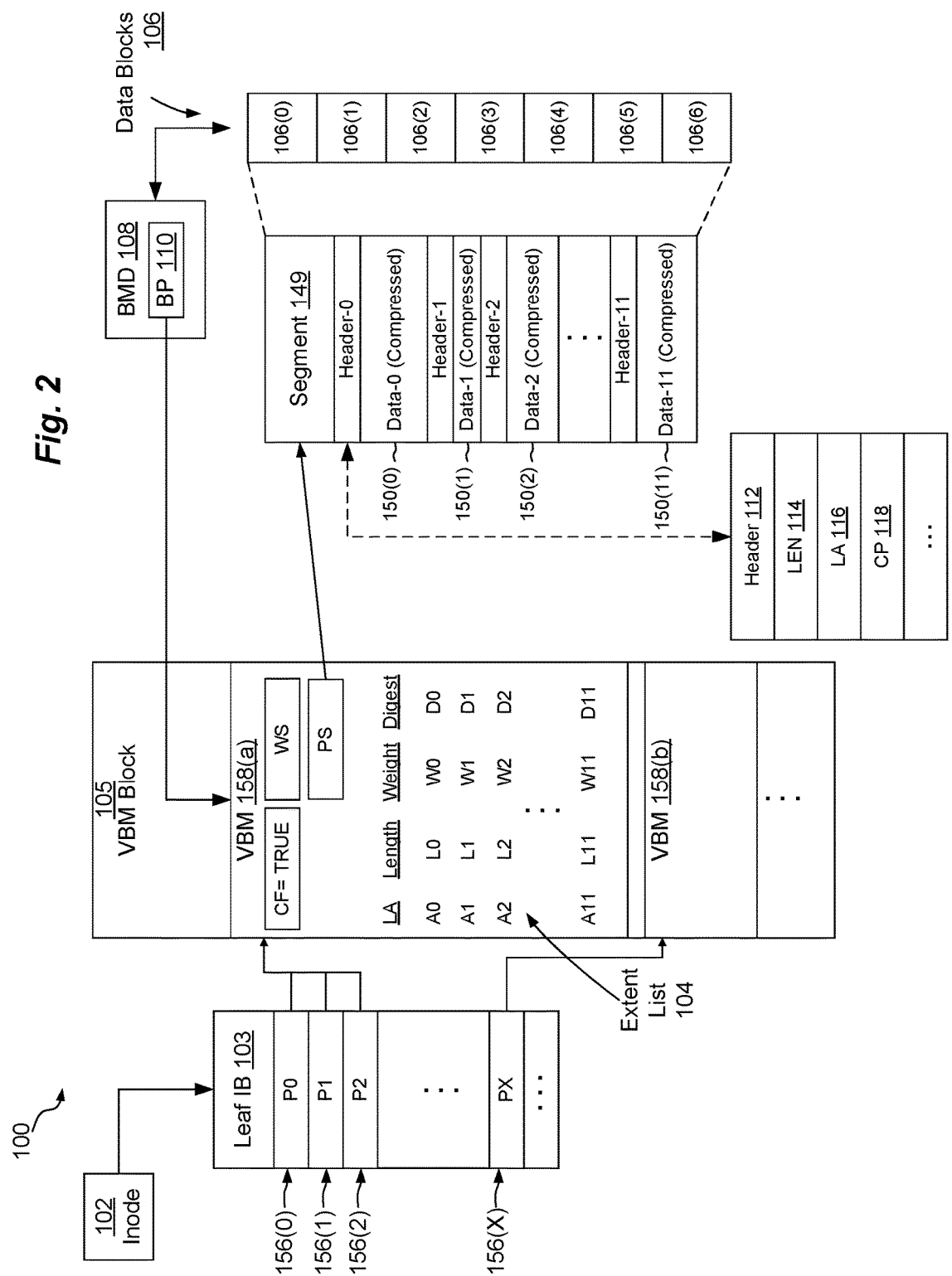
FIG. 2 is a block diagram depicting example data structures used in connection with various embodiments.

FIG. 2 shows an example arrangement 100 of filesystem metadata structures used within storage objects 49 when implemented as filesystems in more detail. A filesystem pointer structure includes an inode 102 that points to a leaf indirect block (IB) 103. Leaf IB 103 includes mapping pointers 156, which map logical addresses of the filesystem to corresponding physical addresses (filesystem block numbers or FSBNs) in the filesystem. For example, mapping pointer 156(0) maps logical address A0, mapping pointer 156(1) maps logical address A1, and mapping pointer 156(2) maps logical address A2. Each logical address (A0, A1, or A2) describes a block-sized increment of storage in the file, even though the underlying data may be compressed to much less than the size of a block. Each of these mapping pointers 156(0), 156(1), 156(2) points to a VBM 158(a).

Leaf IB 103 may include additional mapping pointers 156 (e.g., several in total, up to a maximum permitted number 66 per segment 52, such as, for example, twelve) that all point to VBM 158(a) for addressing respective extents of compressed data in segment 149. Leaf IB 103 may also store additional mapping pointers, such as mapping pointer 156(X), which point to other segments 52 via other VBMs such as VBM 158(b). Leaf IB 103 may include any number of mapping pointers 156, a typical number being 1024.

In the example shown, mapping pointers 156(0), 156(1), 156(2) in leaf IB 103 all point to compressed VBM 158(a). VBM 158(a) has a compression flag CF, a weight WS, and a pointer PS. The compression flag CF indicates whether or not VBM 158(a) represents compressed data, in this example indicating that it does. The weight WS indicates the number of mapping pointers 156 that point to that VBM 158(a), and the pointer PS points to the physical address (FSBN) of the segment 149, which by convention may be selected to be the address of the first data block in segment 149, i.e., data block 106(0). The VBM 158(a) also has an extent list 104. Extent list 104 describes the contents of segment 149 and relates, for each extent of compressed data, the logical address (LA) of that item in the file (e.g., A0, A1, A2, . . . , A11), a length (L0, L1, L2, . . . , L11, e.g., in bytes of that compressed data in the segment 149), a weight (W0, W1, W2, . . . , W11), and a digest (e.g., D0, D1, D2, . . . , D11) of the contents of the extent 150. In an example, the sum of weights of extents in the extent list 104 equals the total weight WS of the VBM 158(a).

As depicted, segment 149 is composed of contiguous data blocks 106, i.e., blocks 106(0) through 106(6). For purposes of storing compressed data, boundaries between blocks 106(0) through 106(7) may be ignored and the segment 149 may be treated as one continuous space. However, in some embodiments, 512-byte sector boundaries within the blocks 106 may be used as valid starting points for each compressed extent or associated header 112.

In an example, segment 149 has associated per-block metadata (BMD) 108. By convention, the BMD 108 may be provided for the first block 106(0) in segment 149. The filesystem ensures that BMD 108 has a known location relative to block 106(0) and vice-versa, such that the location of one implies the location of the other. BMD 108 may also store a back-pointer 110 to the VBM 158(a), i.e., to the particular VBM 158(a) that maps the compressed data stored in segment 149.

The detail shown in segment 149 indicates an example layout of compressed extents 150. For instance, Header-0 can be found immediately before compressed Data-0 in extent 150(0). Likewise, Header-1 can be found immediately before compressed Data-1 in extent 150(1). Similarly, Header-2 can be found immediately before compressed Data-2 in extent 150(2). Since, as depicted, the extent list 104 of VBM 158(a) has twelve entries, segment 149 includes twelve compressed extents 150(0), 150(1), 150(2), . . . , 150(11) and twelve headers 112: Header-0, Header-1, Header-2, . . . , Header-11, one for each respective compressed extent 150.

It should be understood that although extent list 104 is depicted having twelve entries, it may have a different number. Extent list 104 of a compressed VBM 158(a) may have any number of entries (and segment 149 the same number of compressed extents 150) ranging from one up to a maximum permitted number for the ILC feature, which, in some embodiments, is twelve. Segment 149, although depicted as being made up of seven blocks 106(0)-106(6), may have any number of segments 106 as needed to store all of the headers 112 and compressed extents 150, but, in order to make the ILC feature worthwhile, the number of blocks 106 is always at least one less than the number of compressed extents 150 in a segment 149.

A compression header 112 is shown for illustration and is intended to be representative of all compression headers in segment 149 (or in any segment 52). In an example, each compression header 112 is a fixed-size data structure that includes multiple data elements, such as the following:

LEN 114: the length of the corresponding extent of compressed data; e.g., in bytes.

LA 116: the logical address (e.g., A0, A1, A2, . . . , A11) of the corresponding extent of compressed data within the file.

CP 118: a compression procedure (or algorithm) used to compress the data, such as LZ-L3, LZH-L4, "Hardware," and so on.

The header 112 may also include additional elements, such as CRC (Cyclic Redundancy Check) and various flags.

VBM 158(a) and at least one other VBM 158(b) are both depicted as being contained within a single VBM block 105, which is a block (e.g., 8 KB in size) that stores both VBMs 158(a), 158(b) together in persistent storage 44. The size of a VBM 158 can vary by embodiment, but, in one embodiment, a VBM is about 512 bytes, and a VBM block 105 may hold sixteen VBMs 158. A VBM 158 may represent compressed data, as shown in the context of VBM 158(a), or a VBM 158 may instead represent uncompressed data (not depicted), in which case the compression flag CF is set to false, the extent list 104 has a fixed number of entries (e.g., eight), and the segments 149 are of a fixed length, each holding the fixed number of uncompressed blocks 50 without headers 112. In addition, since all extents are the same length when not compressed, there is no need to separately store the Length of each entry. Rather, extent list 104 may instead store a block offset that indicates an offset into segment 149. Since each extent is uncompressed, each extent is stored entirely within a physical block 106 of the segment 149.

Figure 3:
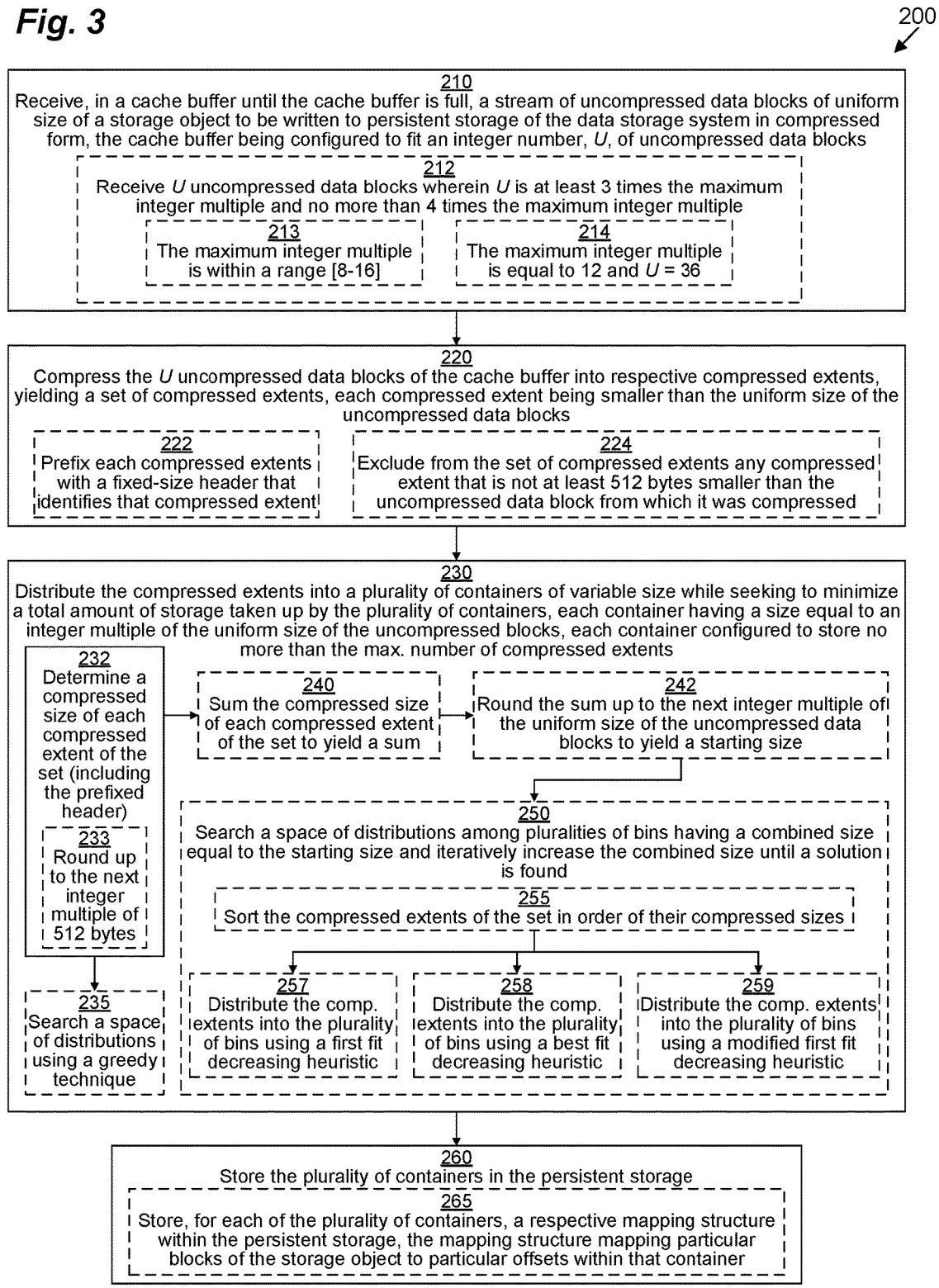
FIG. 3 is a flowchart depicting example methods of various embodiments.

FIG. 3 illustrates an example method 200 performed by storage driver stack 46 for efficiently storing compressed data of a storage object in persistent storage 44. It should be understood that any time a piece of software (e.g., storage driver stack 46, ILC module 48, etc.) is described as performing a method, process, step, or function, in actuality what is meant is that a computing device (e.g., DSS computing device 32) on which that piece of software is running performs the method, process, step, or function when executing that piece of software on its processing circuitry 36. It should be understood that one or more of the steps or sub-steps of method 200 may be omitted in some embodiments. Similarly, in some embodiments, one or more steps or sub-steps may be combined together or performed in a different order. Sub-steps 212, 213, 214, 215, 222, 224, 233,

235, 240, 242, 250, 255, 257, 258, 259, 265 of method 200 that are marked with dashed lines may be deemed to be either optional or representative of alternative embodiments. Method 200 is performed by DSS computing device 32.

In step 210, storage driver stack 46 receives, in cache buffer 58 of cache 56, a stream 70 of uncompressed extents 60 (representing logical blocks addressable by a storage object 49) of uniform size (e.g., 8 KB) of a storage object 49 to be written to persistent storage 44 in compressed form, the cache buffer 58 being configured to fit an integer number, U, of uncompressed extents 60. Once the cache buffer 58 is filled, it stops accepting new data extents 60 until it is flushed, however, in some embodiments, another cache buffer (not depicted) may take its placed during the flushing process so that another instance of method 200 may execute in parallel.

In some embodiments (see sub-step 212), U is selected to be at least 3 times and no more than 4 times the predefined maximum allowable number 66 of compressed extents 54 that may be stored in any data segment 52. However, in other embodiments, another predefined maximum 66 may be used. In some embodiments (see sub-sub-step 213, the predefined maximum 66 of compressed extents 54 that may be stored in any data segment 52 is at least 8 and no more than 16. However, in other embodiments, the predefined maximum 66 may have a different value, such as any value less than 100. In some embodiments (see sub-sub-step 214, the predefined maximum allowable number 66 of compressed extents 54 that may be stored in any data segment 52 is twelve and U is thirty-six.

In step 220, ILC module 48 compresses the U uncompressed data blocks 60 of the cache buffer 58 into respective compressed extents 62, each compressed extent 62 being smaller than the uniform size (e.g., 8 KB) of an uncompressed data block 50 (also the size of the uncompressed extents 60).

In some embodiments, step 220 includes sub-step 222. In sub-step 222, ILC module 48 prefixes each compressed extent 62 with a fixed-length (e.g., 56 bytes) header 112 that identifies that compressed extent 62 (e.g., by indicating its length 114, address 116, compression method 116, hash, etc.).

In some embodiments, step 220 includes sub-step 224. In sub-step 224, ILC module 48 excludes from the set of compressed extents 62 any compressed extent 62 that is not at least 1 sector (e.g., 512 bytes) smaller than the uncompressed data extent 60 from which it was compressed. Since all uncompressed data extents 60 are the same size (e.g., 8 KB), in an example embodiment, sub-step 224 excludes compressed extents 62 if they are larger than 7.5 KB. In other embodiments, ILC module 48 excludes compressed extents 62 that are more than 75% of the uniform size (e.g., 8 KB) of an uncompressed data block 50, thereby excluding compressed extents 62 if they are larger than 6 KB.

In step 230, ILC module 48 distributes the compressed extents 62 into a plurality of containers 64 of variable size while seeking to minimize a total amount of storage taken up by the plurality of containers 64, each container 64 having a size equal to an integer multiple of the uniform size of the uncompressed blocks (e.g., 8 KB), each container 64 configured to store no more than the maximum allowable number 66 of compressed extents 62 (e.g., no more than twelve compressed extents 62 per container 64).

As depicted in FIG. 1, the bins 64 may have variable sizes (indicated by the different sized rectangles). As depicted in the example of FIG. 1, there are at least four bins 64(a), 64(b), 64(c), 64(d), although this may vary depending on the set of uncompressed segments 62. As depicted in the example of FIG. 1, uncompressed extent 62A is distributed into bin 64(a) (indicated by the presence of the letter "A" within bin 64(a)) as are extents 62C, 62F (not depicted), and 62L (not depicted). In addition, uncompressed extents 62B, 62D (not depicted), 62G (not depicted), and 62U are distributed into bin 64(b). Similarly, uncompressed extents 62E (not depicted), 62H (not depicted), and 62K (not depicted) are distributed into bin 64(c). Similarly, uncompressed extents 62I (not depicted) and 62J (not depicted) are distributed into bin 64(d).

Step 230 may include sub-step 232. In sub-step 232, ILC module 48 determines a compressed size of each compressed extent 62 (including the prefixed header 112 in embodiments in which one is used). However, in some embodiments, sub-step 232 may have been performed earlier in the context of step 220. Sub-step 232 may include sub-sub-step 233, in which the compressed size of each compressed extent 62 is rounded up to the next multiple of 512 bytes (or whatever the sector size is). For example, if the compressed size of compressed extent 62B is 6,800 bytes (including 56 bytes of the header 112), then it would be rounded up to 7 KB in sub-sub-step 233.

Sub-step 232 is followed by some kind of search through a space of distributions of compressed extents 62 among various bins 64, constrained by the fact that no bin 64 may contain more than the maximum allowable number 66 of compressed extents 62. The search attempts to find a distribution such that the combined sizes of all of the bins 64 that are used is minimized. This type of search is NP-complete, so it may not always be feasible to perform an exhaustive search for the optimal result. There are various ways to perform such a search, only some of which are illustrated. However, any technique may be used.

In some embodiments (sub-step 235), a greedy search technique is used, as is well-known in the art.

In some embodiments, the search may be performed by performing some of sub-steps 240-259. In sub-step 240, ILC module 48 sums the compressed sizes of all of the compressed segments 62, and, in sub-step 242, ILC module 48 rounds this sum up to the next multiple of the uniform block size (e.g., 8 KB) to yield a starting size. This starting size is the smallest possible amount of space that the set of bins 64 can take up. For example, if the sum of the compressed sizes of a set of thirty-six uncompressed extents 62 is 181 KB, then the sum is rounded up to 184 KB, which is 23 blocks.

Then, in sub-step 250, ILC module 48 searches a space of distributions among pluralities of bins 64 each plurality of bins 64 having a combined size equal to the starting size. If it is not possible to distribute the compresses extents 62 (with their determined sizes) into one set of bins 64 of combined size equal to the starting size (subject to the constraint that no bin 64 may include more than the maximum allowable number 66 of compressed extents 62), then another set of bins 64 of different relative sizes may be searched. If it is not possible to distribute the compresses extents 62 into any set of bins 64 of combined size equal to the starting size (subject to the constraint), then sub-step 250 iteratively increases the starting size and tries again.

In some embodiments, sub-step 250 may include sub-sub-step 255 and one of sub-sub-steps 257, 258, 259. In some embodiments, sub-sub-steps 255, 257, 258, 259 may be performed separately from sub-step 250 (as part of some other way of selecting bin sizes).

In sub-sub-step 255, ILC module 48 sorts the compressed extents 62 in order of their respective compressed sizes.

In sub-sub-step 257, for each distribution of bin sizes, ILC module 48 distributes the compressed extents 62 into the set of bins 64 using a first-fit decreasing heuristic as is well-known in the art.

In sub-sub-step 258, for each distribution of bin sizes, ILC module 48 distributes the compressed extents 62 into the set of bins 64 using a best-fit decreasing heuristic as is well-known in the art.

In sub-sub-step 259, for each distribution of bin sizes, ILC module 48 distributes the compressed extents 62 into the set of bins 64 using a modified first-fit decreasing heuristic as is well-known in the art.

Once the distribution is found in step 250, operation proceeds with step 260. In step 260, storage driver stack 46 stores the set of bins 64 in persistent storage 44 as a set of data segments 52. Thus, if the distribution yields bin 64(a) with a size of 7 blocks, bin 64(b) with a size of 6 blocks, bin 64(c) with a size of 5 blocks, and bin 64(d) with a size of 5 blocks, then bin 64(a) may be stored as data segment 52(a) with a size of 7 blocks, bin 64(b) may be stored as data segment 52(b) with a size of 6 blocks, bin 64(c) may be stored as data segment 52(c) with a size of 5 blocks, and bin 64(d) may be stored as data segment 52(n) with a size of 5 blocks. In the example of FIG. 1, compressed extent 54(a)-1 would then correspond to compressed extent 62A and compressed extent 54(a)-2 would correspond to compressed extent 62C, etc.

In some embodiments, step 260 includes sub-step 265. In sub-step 265, storage driver stack 46 stores, for each of the plurality of data segments 52 that it writes to persistent storage 44, a respective mapping structure (e.g., a VBM 158) within the persistent storage 44, the mapping structure 158 mapping particular blocks of a storage object 49 (in combination with mapping pointers 156 in leaf IBs 103) to particular offsets within that data segment 52 (e.g., using the extent list 104 of the VBM 158).

Thus, techniques have been presented for operating an inline compression system to efficiently pack compressed extents 54, 62 together into segments 52 while reducing or minimizing wasted space. This may be done by buffering a stream 70 of block writes (e.g., uncompressed extents 60) in a cache buffer 58 until a certain number 59 have been received and then applying techniques to pack them, in compressed form, into a more optimal arrangement of segments 52. In some embodiments, the size of each segment 52 is a variable number of blocks, allowing even more flexibility.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one.

Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of efficiently storing compressed data of a storage object in a data storage system, the method comprising:

receiving, in a cache buffer, a number, U, of uncompressed data blocks of a uniform size, the uncompressed data blocks received within write requests directed to the storage object;

compressing the U uncompressed data blocks of the cache buffer into respective compressed extents;

performing an optimization operation including generating a set of distributions of compressed extents among a plurality of containers and searching the set for a distribution having a minimal total amount of storage taken up by its respective plurality of containers, each container having a respective size equal to a respective integer multiple of the uniform size of the uncompressed data blocks; and storing the compressed extents within a plurality of containers in persistent storage in accordance with the distribution having the minimal total amount of storage taken up by its respective plurality of containers.

2. The method of claim 1 wherein each container is configured to store no more than a predefined maximum allowable number of compressed extents.

3. The method of claim 2 wherein generating the set includes excluding from consideration any compressed extent that is not at least 512 bytes smaller than the uncompressed data block from which it was compressed.

4. The method of claim 2 wherein compressing the U uncompressed data blocks of the cache buffer into respective compressed extents includes prefixing each compressed extent with a fixed-size header that describes that compressed extent.

5. The method of claim 4 wherein performing the optimization operation includes determining a compressed size of each compressed extent including the prefixed header and rounding up to the next integer multiple of 512 bytes.

6. The method of claim 5 wherein performing the optimization operation further includes:
sorting the compressed extents in order of their compressed sizes; and
assigning the compressed extents into the plurality of segments using one of a first fit decreasing heuristic, a best fit decreasing heuristic, and a modified first fit decreasing heuristic.

7. The method of claim 5 wherein performing the optimization operation further includes:
summing the compressed size of each compressed extent to yield a sum;
rounding the sum up to the next integer multiple of the uniform size of the uncompressed data blocks to yield a starting size; and
generating and searching a space of distributions among pluralities of containers having a combined size equal to the starting size and iteratively increasing the combined size of the space until a solution is found.

8. The method of claim 2 wherein performing the optimization operation includes searching the set of distributions using a greedy technique.

9. The method of claim 2 wherein receiving the U uncompressed data blocks includes receiving at least 3 times the predefined maximum and no more than 4 times the predefined maximum.

10. The method of claim 2 wherein the predefined maximum is less than 100.

11. The method of claim 2 wherein the predefined maximum is equal to 12 and U is equal to 36.

12. The method of claim 1 wherein storing the compressed extents within the plurality of containers in the persistent storage includes storing, for each of the plurality of containers, a respective mapping structure within the persistent storage, the mapping structure mapping particular blocks of the storage object to particular offsets within that container.

13. An apparatus for efficiently storing compressed data of a storage object, the apparatus comprising:
persistent storage;
network interface circuitry for connecting to a network; and
processing circuitry coupled to memory configured to:
receive, from the network interface circuitry, in a cache buffer of the memory, a number, U, of uncompressed data blocks of a uniform size, the uncompressed data blocks received within write requests directed to the storage object;
compress the U uncompressed data blocks of the cache buffer into respective compressed extents;
performing an optimization operation including generating a set of distributions of compressed extents among a plurality of containers and searching the set for a distribution having a minimal total amount of storage taken up by its respective plurality of containers, each container having a respective size equal to a respective integer multiple of the uniform size of the uncompressed data blocks; and
storing the compressed extents within a plurality of containers in the persistent storage in accordance with the distribution having the minimal total amount of storage taken up by its respective plurality of containers.

14. A computer program product comprising a non-transitory computer-readable storage medium storing a set of instructions, which, when executed by a computing device, causes the computing device to store compressed data of a storage object in persistent storage by:
receiving, in a cache buffer, a number, U, of uncompressed data blocks of a uniform size, the uncompressed data blocks received in write requests directed to the storage object;
compressing the U uncompressed data blocks of the cache buffer into respective compressed extents;
performing an optimization operation including generating a set of distributions of compressed extents among a plurality of containers and searching the set for a distribution having a minimal total amount of storage taken up by its respective plurality of containers, each container having a respective size equal to a respective integer multiple of the uniform size of the uncompressed data blocks; and
storing the compressed extents within a plurality of containers in the persistent storage in accordance with the distribution having the minimal total amount of storage taken up by its respective plurality of containers.

* * * * *